US008238812B2

(12) United States Patent
Kim et al.

(10) Patent No.: US 8,238,812 B2
(45) Date of Patent: Aug. 7, 2012

(54) APPARATUS AND METHOD FOR COLLABORATIVE HYBRID AUTOMATIC REPEAT REQUEST (HARQ) IN BROADBAND WIRELESS COMMUNICATION USING RELAY STATION

(75) Inventors: Dong-Ho Kim, Seoul (KR); Yung-Soo Kim, Seongnam-si (KR); Yeheskel Bar-Ness, Marlboro, NJ (US); Igor Stanojev, Harrison, NJ (US); Osvaldo Simeone, Hoboken, NJ (US)

(73) Assignees: Samsung Electronics Co., Ltd., Suwon-si (KR); New Jersey Institute of Technology, Newark, NJ (US)

( * ) Notice: Subject to any disclaimer, the term of this patent is extended or adjusted under 35 U.S.C. 154(b) by 798 days.

(21) Appl. No.: 11/982,850

(22) Filed: Nov. 5, 2007

(65) Prior Publication Data
US 2008/0160912 A1 Jul. 3, 2008

(30) Foreign Application Priority Data
Nov. 3, 2006 (KR) .................. 10-2006-0108436

(51) Int. Cl.
*H04B 3/36* (2006.01)
*H04B 7/14* (2006.01)
*H04B 7/15* (2006.01)
*H04B 7/185* (2006.01)
*H04B 7/19* (2006.01)

(52) U.S. Cl. ............. 455/7; 455/8; 455/11.1; 455/13.1; 455/13.2

(58) Field of Classification Search ............ 455/7, 8, 455/11.1, 13.1–13.2
See application file for complete search history.

(56) References Cited

U.S. PATENT DOCUMENTS

| 7,668,564 | B2 * | 2/2010 | Onggosanusi et al. | 455/522 |
| 7,693,125 | B2 * | 4/2010 | Ihm et al. | 370/343 |
| 2004/0192204 | A1 * | 9/2004 | Periyalwar et al. | 455/25 |
| 2005/0020313 | A1 * | 1/2005 | Chae et al. | 455/562.1 |
| 2005/0037718 | A1 * | 2/2005 | Kim et al. | 455/101 |
| 2006/0039299 | A1 * | 2/2006 | Ihm et al. | 370/254 |
| 2006/0104242 | A1 | 5/2006 | Kim et al. | |
| 2006/0200722 | A1 * | 9/2006 | Braun | 714/748 |
| 2006/0245384 | A1 * | 11/2006 | Talukdar et al. | 370/310 |
| 2007/0070954 | A1 * | 3/2007 | Kim et al. | 370/334 |
| 2007/0230516 | A1 * | 10/2007 | Torsner et al. | 370/538 |
| 2007/0255993 | A1 * | 11/2007 | Yap et al. | 714/748 |
| 2008/0049718 | A1 * | 2/2008 | Chindapol et al. | 370/351 |
| 2008/0096571 | A1 * | 4/2008 | Pedersen et al. | 455/450 |
| 2009/0086666 | A1 * | 4/2009 | Guvenc et al. | 370/328 |
| 2009/0109892 | A1 * | 4/2009 | Oyman et al. | 370/315 |
| 2009/0116419 | A1 * | 5/2009 | Chong et al. | 370/312 |
| 2009/0116422 | A1 * | 5/2009 | Chong et al. | 370/315 |
| 2011/0158295 | A1 * | 6/2011 | Shiizaki | 375/211 |
| 2011/0179330 | A1 * | 7/2011 | Matsumoto | 714/748 |

FOREIGN PATENT DOCUMENTS

| KR | 1020030056950 A | 7/2003 |
| KR | 1020050021618 A | 3/2005 |
| KR | 1020050046484 A | 5/2005 |

* cited by examiner

*Primary Examiner* — Bobbak Safaipour

(57) ABSTRACT

A collaborative Hybrid Automatic Repeat reQuest (HARQ) in a broadband wireless communication system using a relay station is provided. A transmitting end includes a distance estimator for estimating a distance to a relay station; a controller for determining whether to execute a collaborative HARQ using the estimated distance to the relay station; and a transmitter for, when the execution of the collaborative HARQ is determined and a retransmission request is received from a receiving end, sending a retransmission packet according to a multiple antenna signal processing scheme by constituting a virtual multiple antenna group with the relay station.

18 Claims, 7 Drawing Sheets

APPARATUS AND METHOD FOR COLLABORATIVE HYBRID AUTOMATIC REPEAT REQUEST (HARQ) IN BROADBAND WIRELESS COMMUNICATION USING RELAY STATION

CROSS-REFERENCE TO RELATED APPLICATION(S) AND CLAIM OF PRIORITY

The present application claims priority under 35 U.S.C. §119 to an application filed in the Korean Intellectual Property Office on Nov. 3, 2006 and assigned Serial No. 2006-108436, the contents of which are incorporated herein by reference.

TECHNICAL FIELD OF THE INVENTION

The present invention relates generally to a broadband wireless communication system using a relay station, and in particular, to an apparatus and method for performing a collaborative hybrid automatic repeat request in a broadband wireless communication system using a relay station.

BACKGROUND OF THE INVENTION

Research in the fourth generation (4G) communication system, which is the next generation communication system, has been conducted to provide services of various Quality of Service (QoS) levels to users at a data rate ranging from about 100 Mbps to 16 Gbps. Particularly, the current 4G communication system is advancing to supporting high speed service with the guaranteed mobility and QoS in a broadband wireless access communication system, such as wireless local area network system and wireless metropolitan area network system.

Broadband wireless communication system developers are considering adopting a multi-hop relay data transfer scheme using a relay station for the sake of more efficient services in a wireless environment suffering severe change. The relay station can extend a coverage of a base station and enhance a throughput. In other words, when the relay station is positioned in a specific region in severe channel conditions, the throughput can be increased. Also, by installing the relay station near a cell boundary, a mobile station outside the coverage of the base station may receive service from the base station.

One of the techniques using a relay station is a collaborative Hybrid Automatic Repeat reQuest (HARQ), which is a kind of HARQ scheme using the relay station. In a collaborative HARQ scheme, when a packet error occurs at a receiving end, not only the transmitting end, but also the relay station, sends a retransmission packet to thus attain the diversity effect. Thus, the collaborative HARQ scheme can enhance the reliability of the retransmission packet.

However, the performance of the collaborative HARQ scheme may differ depending on the position of the relay station. When the retransmission is not taken into account and when the same Modulation and Coding Scheme (MCS) level is used, the application of the collaborative HARQ scheme may not achieve its full advantage. Further, even when a multiple antenna environment is virtually constituted with perfect independence, there is no method for utilizing the virtual multiple antenna environment because the transmitting end and the relay station retransmit the signal at the same time.

SUMMARY OF THE INVENTION

To address the above-discussed deficiencies of the prior art, it is a primary aspect of the present invention to substantially solve at least the above problems and/or disadvantages and to provide at least the advantages below. Accordingly, an aspect of the present invention is to provide an apparatus and method for determining whether to execute a collaborative HARQ operation in a broadband wireless communication system using a relay station.

Another aspect of the present invention is to provide an apparatus and method for optimizing a MCS level when a collaborative HARQ operation is adopted in a broadband wireless communication system using a relay station.

A further aspect of the present invention provides an apparatus and method for a transmitting end and a relay station to send a retransmission packet by constituting a virtual multiple antenna environment in a broadband wireless communication system using the relay station.

The above aspects are achieved by providing a transmitting end in a broadband wireless communication system, which includes a distance estimator for estimating a distance to a relay station; a controller for determining whether to execute a collaborative HARQ operation using the estimated distance to the relay station; and a transmitter for, when the execution of the collaborative HARQ operation is determined and a retransmission request is received from a receiving end, sending a retransmission packet according to a multiple antenna signal processing scheme by constituting a virtual multiple antenna group with the relay station.

According to one aspect of the present invention, a relay station in a broadband wireless communication system includes a receiver for restoring an information bit string from an initial transmit packet received from a transmitting end; an encoder for generating a coded bit string by encoding the information bit string; and a transmitter for, when a retransmission request is received from a receiving end, sending a retransmission packet according to a multiple antenna signal processing scheme by constituting a virtual multiple antenna group with the transmitting end.

According to the aspect of the present invention, a packet retransmitting method of a transmitting end in a broadband wireless communication system includes estimating a distance to a relay station; determining whether to execute a collaborative HARQ operation using the estimated distance to the relay station; and when the execution of the collaborative HARQ is determined and a retransmission request is received from a receiving end, sending a retransmission packet according to a multiple antenna signal processing scheme by constituting a virtual multiple antenna group with the relay station.

According to the aspect of the present invention, a packet retransmitting method of a relay station in a broadband wireless communication system includes restoring an information bit string from an initial transmit packet received from a transmitting end; generating a coded bit string by encoding the information bit string; and when a retransmission request is received from a receiving end, sending a retransmission packet according to a multiple antenna signal processing scheme by constituting a virtual multiple antenna group with the transmitting end.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
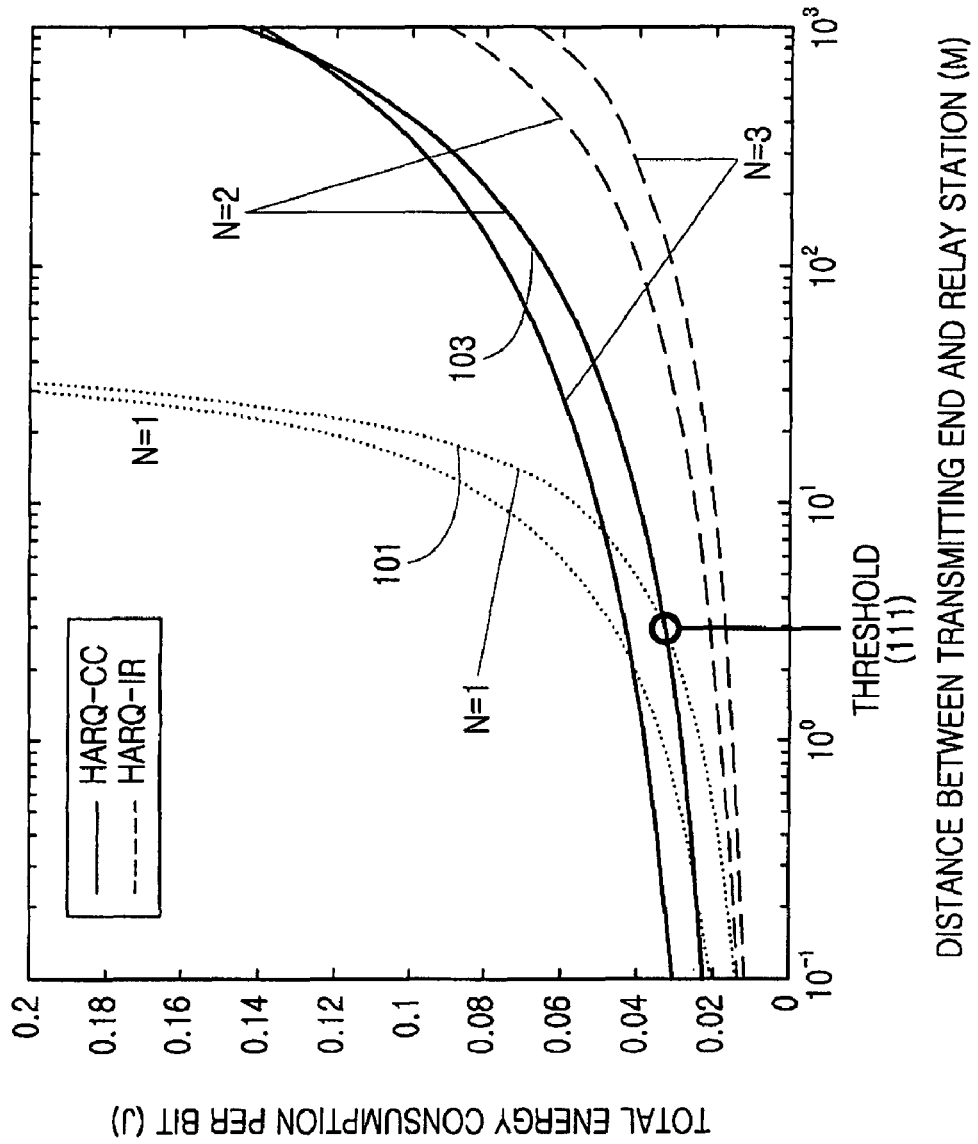
FIG. 1 is a graph showing an energy consumption according to the adoption of a collaborative HARQ scheme in a broadband wireless communication system using a relay station.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The present invention provides a technique for performing a collaborative Hybrid Automatic Repeat reQuest (HARQ) scheme in a broadband wireless communication system using a relay station. Particularly, when a receiving end employs a plurality of receive antennas, the technique can increase a throughput by applying the collaborative HARQ scheme.

To measure an energy consumption in packet transmission and reception, in general, only the energy consumed to send a packet from a transmitting end is taken into account. However, the energy consumption in the packet transmission and reception needs to consider not only the energy consumed in the transmission at the transmitting end but also the energy consumed in the data decoding at the receiving end. In a broadband wireless communication system, since available energy of a mobile terminal is limited, the energy consumed recovering the received data affects the mobility of the terminal. Therefore, it is advantageous to measure the energy consumption according to the adoption of the collaborative HARQ scheme by taking into account not only the energy consumed in transmission at the transmitting end but also the energy consumed in decoding at the receiving end.

When the relay station is not considered in the wireless communication system, the total energy consumed at the transmitting end and the receiving end can be expressed as Equation (1).

$$E_{bt}(n) = n \times \left( K_t E_b + P_c \frac{T_{on}}{L} \right) \quad \text{[Eqn. 1]}$$

In Equation (1), $E_{bt}(n)$ denotes the energy consumption per bit according to n-time transmissions, n denotes the number of data transmissions, $E_b$ denotes the energy consumption per bit according to one time transmission, $P_c$ denotes the sum of the transmit power consumption and the receive power consumption, $T_{on}$ denotes one-time packet transmission time, L denotes the number of bits of the transmitted packet, and $K_t$ denotes the constant based on characteristics of the channel and an amplifier. $K_t$ can be expressed as Equation (2).

$$K_t = (1 + \alpha) \frac{(4\pi)^2 d^\gamma}{G_t G_r \lambda^2} M_l N_f, \; \alpha = \xi/\eta - 1 \quad \text{[Eqn. 2]}$$

In Equation (2), $\xi$ is a drain efficiency of the amplifier of the transmitting end, $\eta$ is a Peak to Average Power Ratio (PAPR) of the transmit signal, d is the transmission distance, $\gamma$ is a propagation loss, $G_t$ is a transmit antenna gain, $G_r$ is a receive antenna gain, $\lambda$ is a wavelength of the carrier, $M_l$ denotes noise and interference, and $N_f$ denotes noise characteristic of the receiving end.

When the collaborative HARQ scheme is applied in Equation (1) by considering the relay station, the energy consumption per bit can be expressed as Equation (3).

$$E_{bt}(n) = \sum_{i=1}^{n} \left\{ p_R(i) \left[ K_t E_b + (P_{ct} + 2P_{cr}) \frac{T_{on}}{L} \right] + \right.$$

$$\left. (1 - p_R(i)) \left[ 2K_t E_b + (2P_{ct} + P_{cr}) \frac{T_{on}}{L} \right] \right\} \quad \text{[Eqn. 3]}$$

In Equation (3), $E_{bt}(n)$ denotes the energy consumption per bit according to the n-time transmissions, n denotes the number of data transmissions, $E_b$ denotes the energy consumption per bit according to one time transmission, $P_{ct}$ denotes the transmit power consumption, $P_{cr}$ denotes the receive power consumption, $T_{on}$ denotes one-time packet transmission time, L denotes the number of bits of the transmitted packet, $p_R(i)$ denotes a reception failure probability in (i−1)-th transmission, and $K_t$ denotes the constant based on characteristics of the channel and an amplifier.

The required minimum energy consumption $E_{bt}$ per bit based on the distance change between the transmitting end and the relay station using Equation (3) is shown in FIG. 1.

FIG. 1 shows the required minimum energy consumption $E_{bt}$ per bit based on the distance between the transmitting end and the relay station in the different numbers of the transmissions when the collaborative HARQ is executed.

When the distance between the transmitting end and the relay station is short, a Chase Combining (CC) scheme in FIG. 1 consumes more energy than the conventional transmission scheme which does not consider the relay station, because of the collaborative HARQ. Yet, as the distance between the transmitting end and the relay station becomes long, the retransmission lessens the required minimum energy consumption per bit. An Incremental Redundancy (IR) scheme exhibits less required minimum energy per bit regardless of the distance between the transmitting end and the relay station when the collaborative HARQ is executed.

In FIG. 1, a cross point of a curve 101 indicative of no retransmission and a curve 103 indicative of one-time retransmission is set to a threshold 111, and whether the collaborative HARQ is executed or not is determined. Therefore, the receiving end can successfully restore the data with less energy consumption. Herein, the threshold 111 may vary according to various system factors. Accordingly, in the real system, the threshold 111 will be properly determined according to characteristics of the system.

Hereafter, to facilitate understanding, the collaborative HARQ scheme using the relay station is referred to as a collaborative HARQ and the HARQ without the relay station is referred to as a single HARQ.

Prior to detailed descriptions of the transmitting end and the relay station for the collaborative HARQ, a structure of the relay station system of the present invention is briefly provided.

The transmitting end of the present invention can be any one of a base station or a terminal. The transmitting end and the receiving end can directly communicate with each other without using the relay station. At this time, while the relay station may act as the relay between the transmitting end and the receiving end, the terminal can be used as the relay station as well. Notably, when the terminal is used as the relay station, it is preferable that the terminal is in a standby mode without communications. Since the relay station of the present invention is mobile, whether to execute the collaborative HARQ depends on the distance between the transmitting end and the relay station.

FIGS. 2A to 2D are simplified diagrams of data transmission and reception in a broadband wireless communication system using a relay station according to the present invention.

Figure 2B:
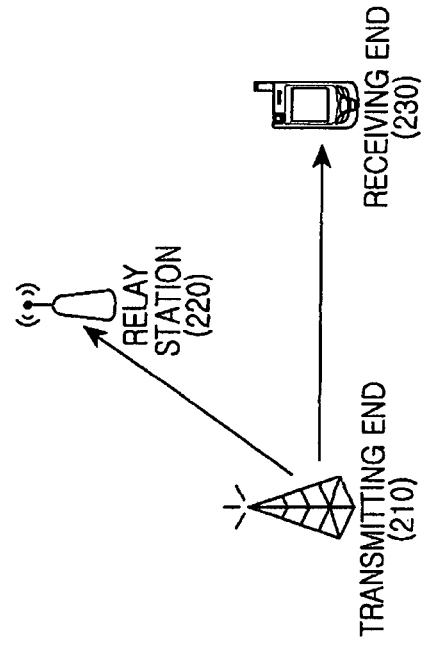
FIGS. 2A to 2D are simplified diagrams of data transmission and reception in a broadband wireless communication system using a relay station according to the present invention.
Figure 2D:
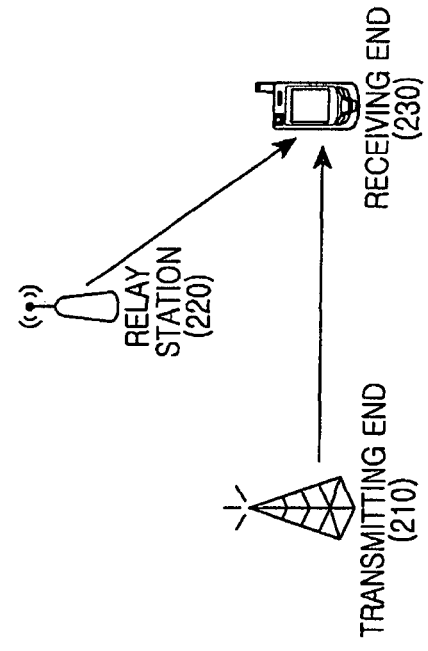
Figure 2A:
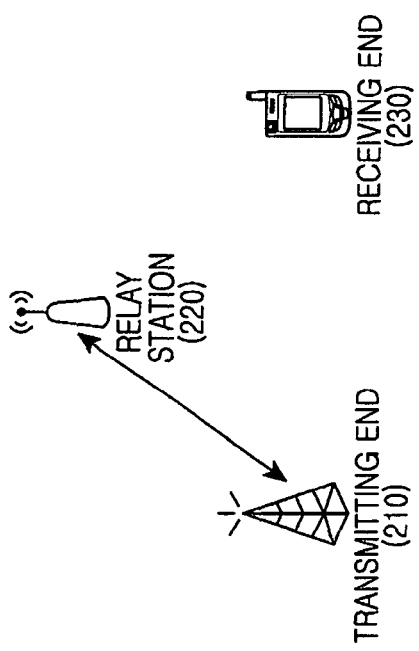

The relay station 220 in FIG. 2A feeds its position information or channel condition information back to the transmitting end 210. The transmitting end 210 calculates the distance to the relay station 220 using the information fed back from the relay station 220, determines whether to execute the collaborative HARQ based on the criterion of FIG. 1, and informs the relay station 220 of the determination.

Next, the transmitting end 210 sends an initial transmit packet to the receiving end 230 as shown in FIG. 2B. As the transmitting end 210 broadcasts the data packet, the relay station 220 can also receive the initial transmit packet. In doing so, a Modulation and Coding Scheme (MCS) level applied to the initial transmit packet is determined by taking into account the channel condition between the transmitting end 210 and the relay station 220. The MCS level selected by considering the channel to the relay station 220 in the relatively good channel condition may not guarantee the reception success at the receiving end 230. Yet, when the MCS level is selected by considering the channel to the relay station 220, the packet transmission at a high data rate can be attempted. Even when the transmission fails, it is advantageous in view of the energy consumption because the determination of the collaborative HARQ execution takes into account the energy consumption of the retransmission.

Figure 2C:
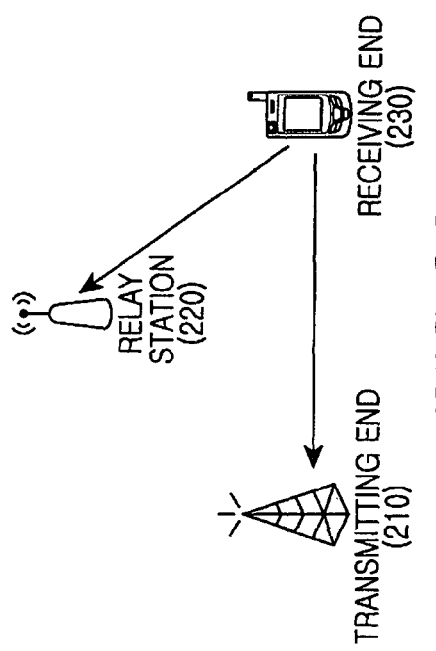

In FIG. 2C, the receiving end 230 fails to receive the initial transmit packet and broadcasts a Non Acknowledge (NACK) message to the transmitting end 210 and the relay station 220.

In FIG. 2D, the transmitting end 210 and the relay station 220 send a retransmission packet to the receiving end 230. While the retransmission can employ the IR scheme or the CC scheme, the retransmission using the IR scheme exhibits high gain in view of the energy consumption as shown in FIG. 1. Hence, the IR scheme is preferred in the retransmission. When retransmitting by using the IR scheme, the transmitting end 210 and the relay station 220 do not send the same retransmission packet. Instead, the retransmission packet is sent by constituting a virtual multiple antenna group with the transmit antennas of the transmitting end 210 and the relay station 220 respectively and applying a Multiple Input Multiple Output (MIMO) scheme. In other words, when the number of receive antennas of the receiving end 230 is sufficient (that is, when the number of the receive antennas of the receiving end 230 is greater than the number of the transmit antennas of the transmitting end 210 and the relay station 220), the transmitting end 210 and the relay station 220 can adopt a Spatial Multiplexing (SM) scheme. Namely, the transmitting end 210 and the relay station 220 can raise the data rate by sending the packet of different IR versions. Even when the number of the receive antennas of the receiving end 230 is not sufficient, the diversity gain and the multiplexing gain can be obtained by adopting a space-time coding scheme such as Alamouti space-time block code. Next, when the reception fails even after sending every redundancy bit using the IR scheme, the transmitting end 210 and the relay station 220 perform the retransmission using the CC scheme.

Now, the structures and the operations of the transmitting end and the relay station for the collaborative HARQ are described in detail.

Figure 3:
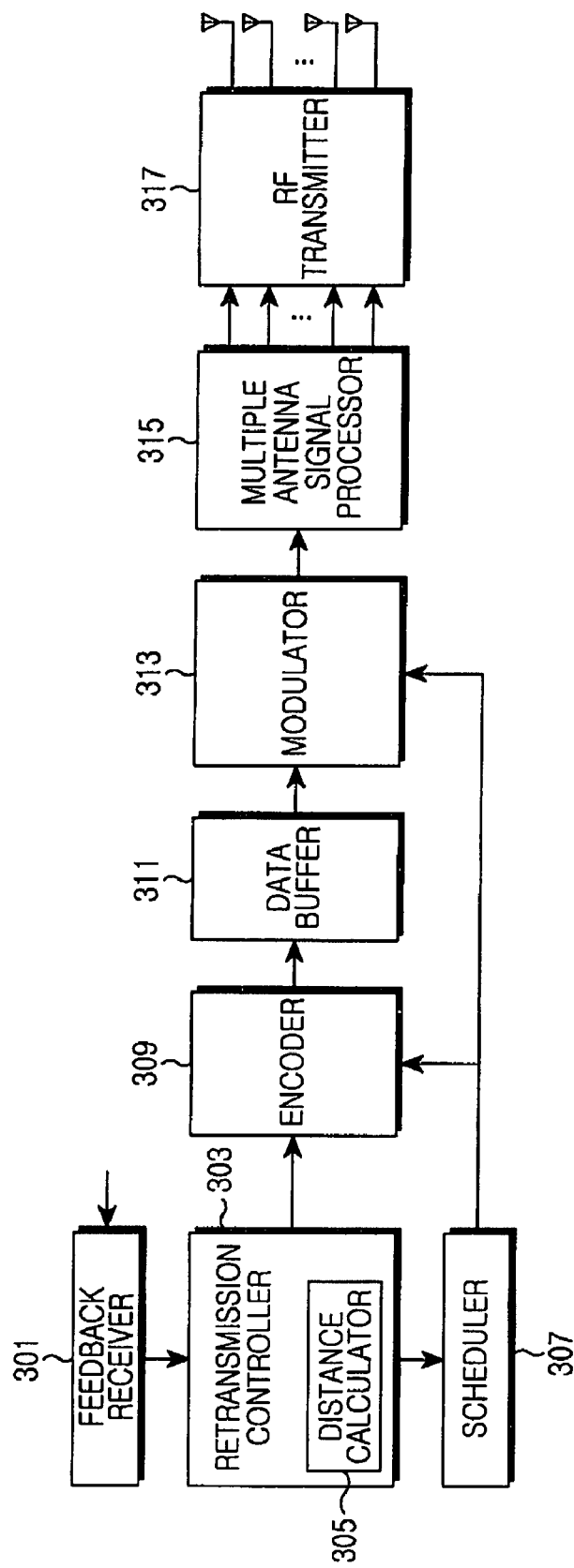
FIG. 3 is a block diagram of a transmitting end in the broadband wireless communication system using the relay station according to the present invention.

FIG. 3 is a block diagram of the transmitting end in the broadband wireless communication system using the relay station according to the present invention.

The transmitting end of FIG. 3 includes a feedback receiver 301, a retransmission controller 303, a scheduler 307, an encoder 309, a data buffer 311, a modulator 313, a multiple antenna signal processor 315, and a Radio Frequency (RF) transmitter 317. Herein, the transmitting end of FIG. 3 includes a plurality of transmit antennas. It should be understood that the transmitting end may include a single transmit antenna and may send a signal using only one of the transmit antennas.

The feedback receiver 301 receives the position information or the channel condition information of the relay station fed back from the relay station. That is, the feedback receiver 301 receives the information usable for measuring the distance to the relay station.

The retransmission controller 303 controls overall operation of the collaborative HARQ. A distance calculator 305 calculates the distance to the relay station using the position information or the channel condition information of the relay station provided from the feedback receiver 301. The retransmission controller 303 determines whether to execute the collaborative HARQ by referring to the energy consumption information based on the distance of FIG. 1 and the distance information calculated at the distance calculator 305. For the retransmission using the IR scheme, the retransmission controller 303 sets a virtual multiple transmit antenna group using the transmit antennas of the relay station and the transmit antennas of the transmitting end and determines the distribution of the redundancy bits and the multiple antenna signal processing scheme (e.g., SM and space-time coding). For example, using the IR scheme, the retransmission controller 303 determines the IR version of the retransmission packets to be sent by the transmitting end and the relay station. The retransmission controller 303 generates a collaborative HARQ notification message including the collaborative HARQ execution information and the retransmission packet format information, and controls sending the collaborative HARQ notification message to the relay station and the receiving end.

When the collaborative HARQ is executed, the scheduler 307 determines an MSC level to be applied to the initial transmit packet. The MCS level is determined by taking into account the channel with the relay station, rather than the channel with the receiving end. The scheduler 307 determines the MCS level to be applied to the initial transmit packet and provides the determined MCS level to the encoder 309 and the modulator 313.

The encoder 309 encodes user data according to a coding scheme provided from the scheduler 307. For example, the encoder 309 can be implemented using a convolutional encoder, a turbo encoder, or a Low Density Parity Check (LDPC) encoder. A Cyclic Redundancy Code (CRC) is inserted for the error check at the receiving end. The data buffer 311 temporarily stores the encode bit string output from the encoder 309 and outputs part or all of the bit string under the control of the retransmission controller 303. In specific, when the collaborative HARQ is executed using the IR scheme, the data buffer 311 outputs the first packet for the initial transmission by splitting the encoded bit string to N-ary packets and outputs (N+k)-th packet in the retransmission. In doing so, the packets in the initial transmission and the retransmission may not be consecutive according to the collaborative HARQ packet format determined at the retransmission controller 303. When the packet is sent using the SM scheme by constituting the virtual multiple transmit antenna group including the transmit antennas of the relay station, the retransmission packet sent by the relay station is different to the retransmission packet sent by the transmitting end. The modulator 313 modulates the bit string fed from the data buffer 311 according to the modulation scheme informed from the scheduler 307.

The multiple antenna signal processor 315 processes the complex symbols fed from the modulator 313 for the retransmission according to the retransmission packet format determined at the retransmission controller 303. For example, using the SM scheme, the multiple antenna signal processor 315 arranges and outputs the fed complex symbols to send them via the corresponding antennas. Using the space-time coding scheme, the multiple antenna signal processor 315 arranges and outputs the complex symbols converted according to the corresponding space-time coding scheme to send them via the corresponding antennas. The multiple antenna signal processor 315 can perform the multiple antenna signal processing with respect to the initial transmit packet, which is determined based on the number of the antennas used at the transmitting end and the receiving end and the channel condition. The RF transmitter 317 converts the baseband signals provided from the multiple antenna signal processor 315 to RF signals and sends the RF signals over the antennas.

Figure 4:
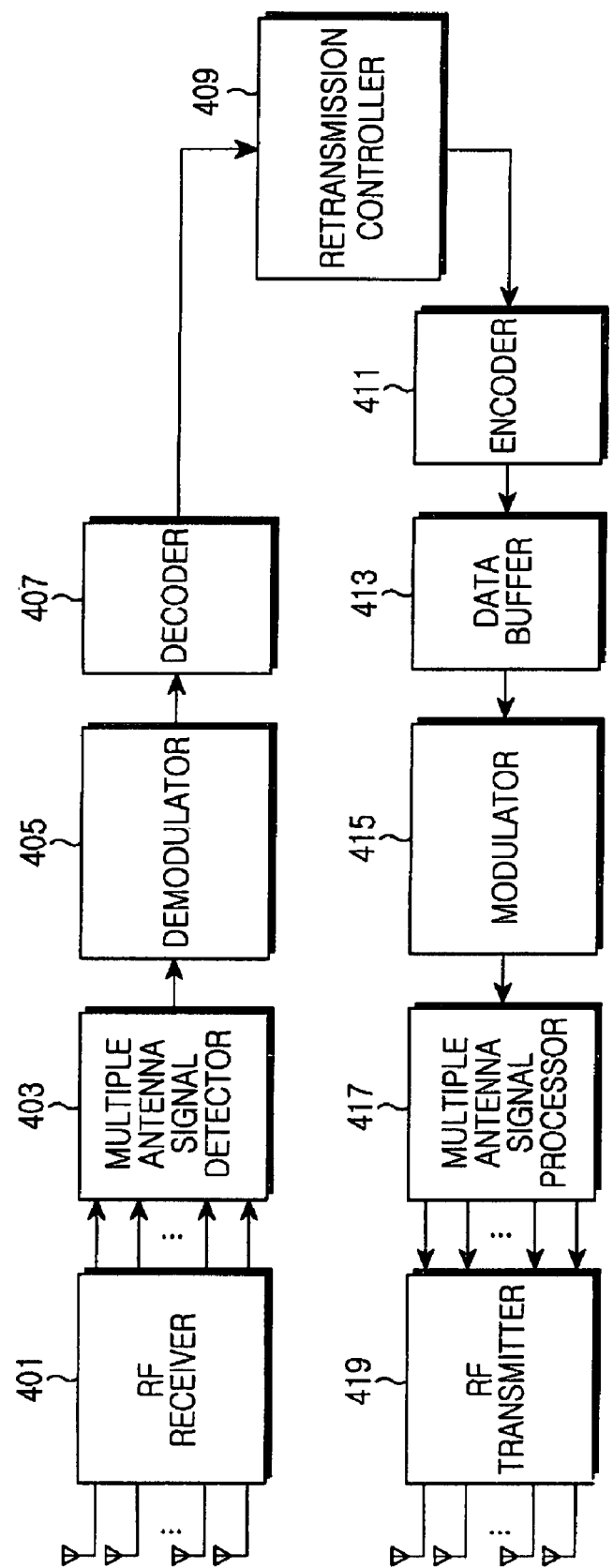
FIG. 4 is a block diagram of a relay station in the broadband wireless communication system using the relay station according to the present invention.

FIG. 4 is a block diagram of the relay station in the broadband wireless communication system using the relay station according to the present invention.

The relay station of FIG. 4 includes an RF receiver 401, a multiple antenna signal detector 403, a demodulator 405, a decoder 407, a retransmission controller 409, an encoder 411, a data buffer 413, a modulator 415, a multiple antenna signal processor 417, and an RF transmitter 419. The relay station of FIG. 4 includes a plurality of transmit and receive antennas. Note that the relay station may include a single transmit and receive antenna and that the relay station may utilize only one of the transmit and receive antennas.

The RF receiver 401 converts RF signals received on the antennas to baseband signals. The multiple antenna signal detector 403 detects symbols before the multiple antenna signal processing by checking receive signals of the antennas of the baseband signals provided from the RF receiver 401. When the transmitting end sends the initial transmit packet using the single antenna, the multiple antenna signal detector 403 bypasses the signal from the transmitting end. The demodulator 405 restores the coded bit string by demodulating the symbols fed from the multiple antenna signal detector 403 using the corresponding demodulation scheme. The decoder 407 restores the information bit string by decoding the bit string fed from the demodulator 405 using the corresponding decoding scheme.

When the collaborative HARQ notification message is received from the transmitting end, the retransmission controller 409 receives the data packet sent from the transmitting end to the receiving end. When the receiving end fails to receive the packet, the retransmission controller 409 controls retransmission of the packet. In specific, when the information bit string of the data packet sent from the transmitting end to the receiving end is restored through the RF receiver 401, the multiple antenna signal detector 403, the demodulator 405, and the decoder 407, the retransmission controller 409 constitutes the same transmit packets as in the transmitting end by encoding the information bit string and generating the redundancy bits. When confirming the NACK message transmitted from the receiving end, the retransmission controller 409 controls retransmission the packet according to the retransmission packet format determined at the transmitting end. Herein, the information relating to the retransmission packet format is contained in the collaborative HARQ notification message received from the transmitting end. For example, the information relating to the packet format includes IR version information to be retransmitted by the relay station in the IR retransmission.

The encoder 411 generates the same coded bit string as the coded bit string generated at the transmitting end by encoding the information bit string restored from the packets sent from the transmitting end to the receiving end in the same manner as in the transmitting end. The data buffer 413 temporarily stores the coded bit string fed from the encoder 411 and outputs part or all of the bit string under the control of the retransmission controller 409. Specifically, in the collaborative HARQ using the IR scheme, the data buffer 413 splits the encoded bit string to N-ary packets and outputs the corresponding packet according to the retransmission packet format informed from the transmitting end in the retransmission. The modulator 415 outputs the complex symbols by modulating the bit string fed from the data buffer 413 using the corresponding modulation scheme.

The multiple antenna signal processor 417 processes the complex symbols fed from the modulator 415 for the retransmission according to the retransmission packet format determined by the retransmission controller 409. For example, using the SM scheme, the multiple antenna signal processor 417 arranges the fed complex symbols to send them via the respective antennas. Using the space-time coding scheme, the multiple antenna signal processor 417 substitutes the complex symbols according to the corresponding space-time coding scheme to send them via the respective antennas. The RF transmitter 419 converts the baseband signals provided from the multiple antenna signal processor 417 to RF signals and sends the RF signals via the antennas.

Figure 5:
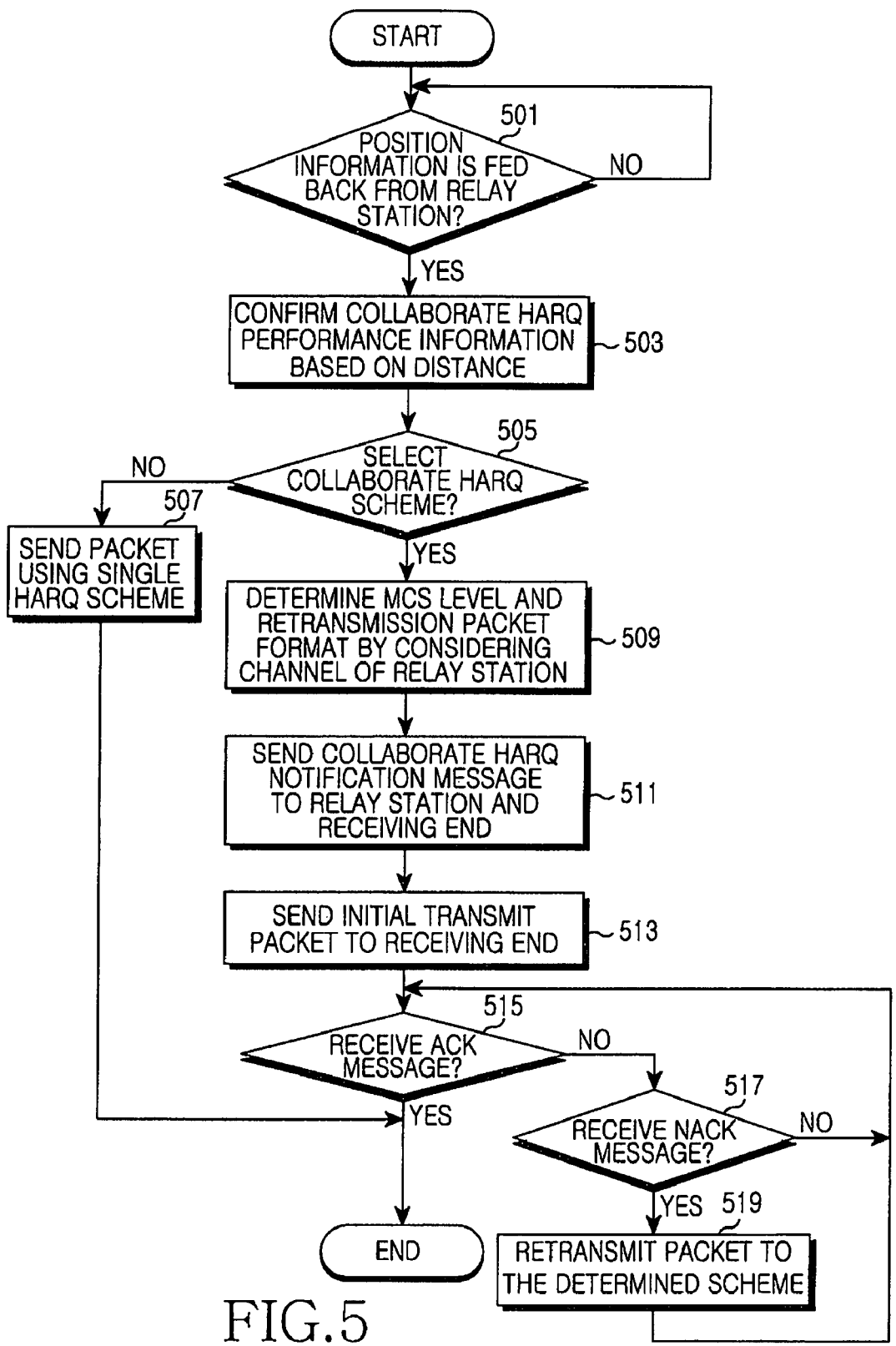
FIG. 5 illustrates a data packet transmitting method of the transmitting end in the broadband wireless communication system using the relay station according to the present invention.

FIG. 5 illustrates a data packet transmitting method of the transmitting end in the broadband wireless communication system using the relay station according to the present invention.

The transmitting end examines whether the position information is fed back from the relay station in step 501. The position information is the information for estimating the distance between the transmitting end and the relay station. Alternatively, the position information may be other information (e.g., channel condition information) for estimating the distance.

Upon receiving the position information of the relay station, the transmitting end confirms the performance information (e.g., the threshold 111 in FIG. 1) of the collaborative HARQ scheme based on the distance in step 503.

After confirming the performance of the collaborative HARQ scheme based on the distance, the transmitting end calculates the distance to the relay station using the fed position information of the relay station and determines whether to execute the collaborative HARQ scheme in step 505.

When the collaborative HARQ scheme is not executed, the transmitting end sends the packet using the single HARQ scheme in step 507. In detail, after sending the packet, when a NACK message is received from the receiving end, the transmitting end retransmits the packet.

By contrast, when the collaborative HARQ scheme is executed, the transmitting end determines the MCS level to be applied to the initial packet transmission by considering the channel of the relay station in step 509. Also, to retransmit the packet, the transmitting end determines the packet format to use. Specifically, the transmitting end determines whether to adopt the IR scheme or the CC scheme in the packet retransmission and whether to adopt the SM scheme or the space-time coding scheme at the relay station and the constituted virtual multiple antenna group. For example, using the IR scheme, the transmitting end distributes the redundancy bits; that is, the IR versions for itself and the relay station.

After determining the MCS level and the retransmission packet format, the transmitting end sends the collaborative HARQ notification message to the relay station and the receiving end in step 511. The collaborative HARQ notification message contains the determined retransmission packet format information. For example, the retransmission packet format information includes the information of the IR version distributed in step 509.

After sending the collaborative HARQ notification message, the transmitting end generates the initial transmit packet according to the MCS level determined in step 509 and sends the initial transmit packet to the receiving end and the relay station in step 513.

In step 515, the transmitting end examines whether an ACK message is received from the receiving end. When receiving the ACK message, the transmitting end finishes this process.

By contrast, when not receiving the ACK message, the transmitting end examines whether a NACK message is received in step 517.

Upon receiving the NACK message, the transmitting end processes and sends a retransmission packet according to the determined retransmission packet format in step 519. In more detail, the transmitting end sends the retransmission packet according to the retransmission scheme and the multiple antenna scheme determined in step 509. For instance, the transmitting end sends the retransmission packet of the different IR version from the IR version of the retransmission packet sent from the relay station. Alternatively, the transmitting end sends the retransmission packet by applying the space-time coding scheme using the virtual multiple antenna group.

Figure 6:
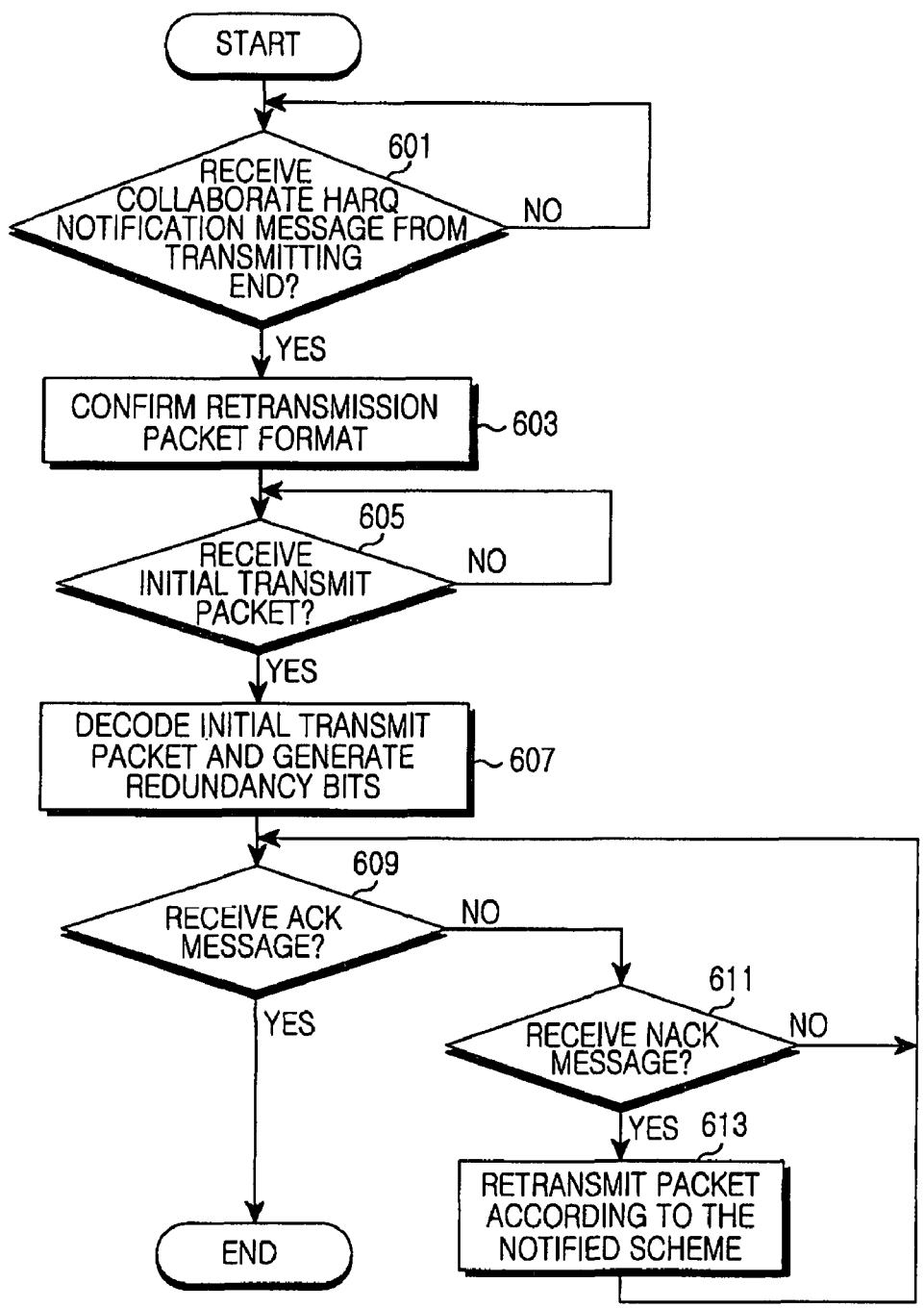
FIG. 6 illustrates a data packet transmitting method of the relay station in the broadband wireless communication system using the relay station according to the present invention.

FIG. 6 illustrates a data packet transmitting method of the relay station in the broadband, wireless communication system using the relay station according to the present invention.

The relay station examines whether the collaborative HARQ notification message is received from the transmitting end in step 601.

When receiving the collaborative HARQ notification message, the relay station checks the retransmission packet format contained in the collaborative HARQ notification message in step 603. For example, the relay station checks whether the SM scheme or the space-time coding scheme is used for the retransmission. When the SM scheme is adopted, the relay station confirms the information of the redundancy bit distribution; that is, the information of the IR version distribution of the retransmission packet.

In step 605, the relay station examines whether the initial transmit packet is received from the transmitting end.

Upon receiving the initial transmit packet, the relay station restores the information bit string by demodulating and decoding the received initial transmit packet and generates the redundancy bit string by encoding the restored information bit string in the same manner as in the transmitting end in step 607.

In step 609, the relay station examines whether the ACK message is received from the receiving end.

When receiving the ACK message, the relay station finishes this process because the packet transmission is successfully completed.

When receiving no ACK message, the relay station examines whether a NACK message is received in step 611.

Upon receiving the NACK message, the relay station processes and sends the retransmission packet according to the information confirmed from the collaborative HARQ notification message in step 613. In specific, the relay station sends the retransmission packet according to the retransmission scheme and the multiple antenna scheme confirmed in step 603. For instance, the relay station sends the retransmission packet of the different IR version from the IR version of the retransmission packet sent from the transmitting end. Alternatively, the relay station sends the retransmission packet by applying the space-time coding scheme using the virtual multiple antenna group.

Figure 7:
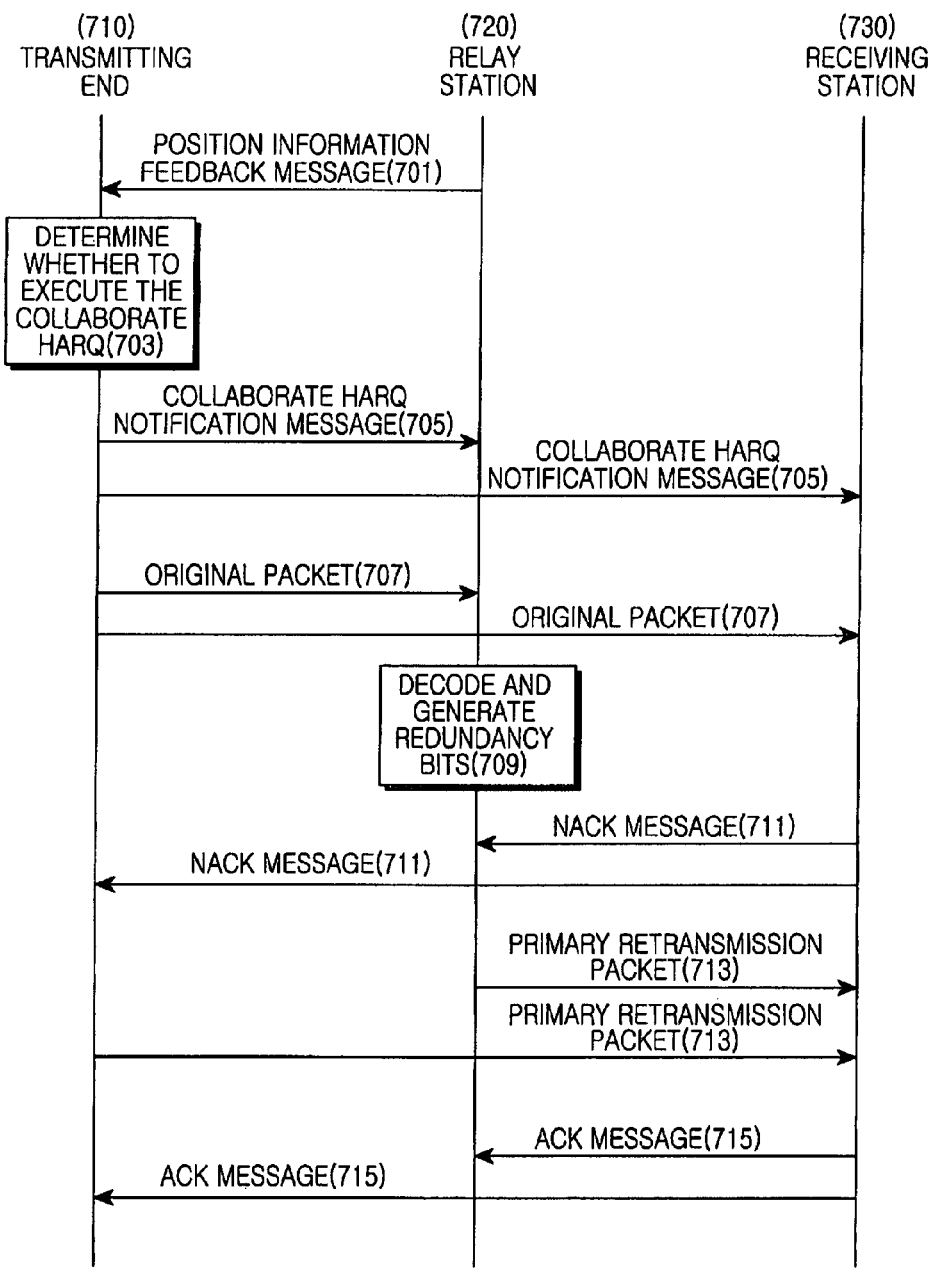
FIG. 7 illustrates signal exchanges between the transmitting end, the relay station, and the receiving end in the broadband wireless communication system using the relay station according to the present invention.

FIG. 7 illustrates signal exchanges between the transmitting end, the relay station, and the receiving end in the broadband wireless communication system using the relay station according to the present invention.

In FIG. 7, the relay station 720 sends the position information message to the transmitting end 710 in step 701. The position information message carries the position information of the relay station 720. Alternatively, the position information message may carry a message of other information (e.g., signal strength information) for estimating the distance, rather than the position information.

Receiving the position information message, the transmitting end 710 estimates the distance to the relay station 720 using the position information contained in the message and determines whether to execute the collaborative HARQ by comparing the estimated distance and the energy consumption information based on the distance of FIG. 1 in step 703. After determining to execute the collaborative HARQ, the transmitting end 710 determines the retransmission packet format. In specific, by referring to the information relating to the number of the receive antennas of the receiving end 730, the transmitting end 710 selects the multiple antenna signal processing scheme (e.g., SM or space-time coding) and thus determines the retransmission packet format.

Upon determining to execute the collaborative HARQ, the transmitting end 710 sends the collaborative HARQ notification message to the relay station 720 and the receiving end 730 in step 705. The collaborative HARQ notification message carries the retransmission packet format information. Accordingly, the relay station 720 constitutes and processes the retransmission packet according to the retransmission packet format information and the receiving end 730 restores the received signal according to the retransmission packet format information.

Next, the transmitting end 710 broadcasts the original packet; that is, the initial transmit packet to the relay station 720 and the receiving end 730 in step 707.

The relay station 720, receiving the original packet, restores the information bit string from the original packet and generates the redundancy bits by encoding the restored information bit string in the same manner as in the transmitting end 710 in step 709.

In step 711, the receiving end 730 fails to restore the information bit string and broadcasts the NACK message to the relay station 720 and the transmitting end 710.

Upon receiving the NACK message, in step 713, the transmitting end 710 and the relay station 720 send the primary retransmission packet with the corresponding retransmission packet format according to the determination in step 703. In doing so, the transmitting end 710 and the relay station 720 send the primary retransmission packet according to various embodiments. For example, using the IR scheme, the transmitting end 710 and the relay station 720 send the retransmission packet of the different IR versions according to the SM scheme at the same time. Alternatively, the transmitting end 710 and the relay station 720 send the retransmission packet by applying the space-time coding scheme using the virtual multiple antenna group.

Receiving the primary retransmission packet, the receiving end 730 successfully restores the information bit string by combining the original packet with the retransmission packet and sends the ACK message to the relay station 720 and the transmitting end 710.

As set forth above, the broadband wireless communication system using the relay station determines whether to execute the collaborative HARQ by taking into account the energy consumption. Therefore, the criterion of utilizing the proper collaborative HARQ based on the position of the relay station can be provided. Further, the performance of the collaborative HARQ scheme can be enhanced by using the virtual multiple antenna environment including the transmit antennas of the relay station and the transmitting end.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A transmitting end in a wireless communication system, comprising:
    a distance estimator configured to estimate a distance to a relay station;
    a controller configured to determine whether to execute a collaborative Hybrid Automatic Repeat reQuest (HARQ) according to whether the distance to the relay station exceeds a threshold value, wherein the threshold value is a condition in which a required minimum energy consumption per bit when the collaborative HARQ is used is the same as a required minimum energy consumption per bit when no retransmission is performed; and
    a transmitter configured to send a retransmission packet according to a multiple antenna signal processing scheme by constituting a virtual multiple antenna group with at least one antenna of the transmitter and at least one antenna of the relay station when the execution of the collaborative HARQ is determined and a retransmission request is received from a receiving end.

2. The transmitting end of claim 1, wherein the distance estimator estimates the distance using at least one of position information or channel information received from the relay station.

3. The transmitting end of claim 1, further comprising: a scheduler configured to determine a Modulation and Coding Scheme (MCS) level for sending an initial transmit packet by taking into account a channel condition of the relay station, wherein the transmitter is configured to send an original packet generated according to the determined MCS level to the relay station and the receiving end.

4. The transmitting end of claim 1, wherein the transmitter is configured to send the retransmission packet of an Incremental Redundancy (IR) version different from an IR version of a retransmission packet sent from the relay station.

5. The transmitting end of claim 1, wherein the transmitter is configured to send the retransmission packet by applying a space-time coding scheme to the retransmission packet using the virtual multiple antenna group.

6. The transmitting end of claim 1, wherein the controller is configured to generate a notification message to notify the receiving end and the relay station of whether the collaborative HARQ is executed or not and retransmission packet transmission scheme information.

7. The transmitting end of claim 6, wherein the notification message comprises IR version distribution information.

8. The transmitting end of claim 1, wherein the transmitter is configured to send the retransmission packet using a single HARQ scheme when the controller determines not to execute a collaborative Hybrid Automatic Repeat reQuest.

9. The transmitting end of claim 4, wherein when the retransmission packet of the Incremental Redundancy (IR) version different from the IR version of a retransmission packet sent from the relay station fails, the transmitter is configured to perform a retransmission of the retransmission packet using a chase combining scheme.

10. A packet retransmitting method of a transmitting end in a wireless communication system, the method comprising:
    estimating a distance to a relay station;
    whether to execute a collaborative Hybrid Automatic Repeat reQuest (HARQ) according to whether the distance to the relay station exceeds a threshold value, wherein the threshold value is a condition in which a required minimum energy consumption per bit when the collaborative HARQ is used is the same as a required minimum energy consumption per bit when no retransmission is performed; and
    when the execution of the collaborative HARQ is determined and a retransmission request is received from a receiving end, sending a retransmission packet from the transmitting end and the relay end according to a multiple antenna signal processing scheme by constituting a virtual multiple antenna group with at least one antenna of a transmitter and at least one antenna of the relay station.

11. The packet retransmitting method of claim 10, wherein the distance is estimated using at least one of position information or channel information received from the relay station.

12. The packet retransmitting method of claim 10, further comprising:
  determining a Modulation and Coding Scheme (MCS) level for sending an initial transmit packet by taking into account a channel condition of the relay station; and
  sending an original packet generated according to the determined MCS level to the relay station and the receiving end.

13. The packet retransmitting method of claim 10, wherein the retransmission packet sending operation comprises:
  sending the retransmission packet of an Incremental Redundancy (IR) version different from an IR version of a retransmission packet sent from the relay station.

14. The packet retransmitting method of claim 10, wherein the retransmission packet sending operation comprises:
  sending the retransmission packet by applying a space-time coding scheme to the retransmission packet using the virtual multiple antenna group.

15. The packet retransmitting method of claim 10, wherein a notification message is transmitted to notify the receiving end and the relay station of whether the collaborative HARQ is executed or not and retransmission packet transmission scheme information.

16. The packet retransmitting method of claim 15, wherein the notification message comprises IR version distribution information.

17. The packet retransmitting method of claim 10, further comprising sending the retransmission packet using a single HARQ scheme upon determining that a collaborative Hybrid Automatic Repeat reQuest is not to be executed.

18. The packet retransmitting method of claim 13, further comprising when the sending of the retransmission packet of an Incremental Redundancy (IR) version different from an IR version of a retransmission packet sent from the relay station fails, performing a retransmission of the retransmission packet using a chase combining scheme.

* * * * *